(12) United States Patent
Perry

(10) Patent No.: US 6,919,916 B2
(45) Date of Patent: Jul. 19, 2005

(54) METHOD AND DEVICE FOR CREATING A FACSIMILE OF AN IMAGE

(75) Inventor: Scott M Perry, Altadena, CA (US)

(73) Assignee: Production Resource Group Inc., New Windsor, NY (US)

( * ) Notice: Subject to any disclaimer, the term of this patent is extended or adjusted under 35 U.S.C. 154(b) by 138 days.

(21) Appl. No.: 09/837,876

(22) Filed: Apr. 17, 2001

(65) Prior Publication Data

US 2002/0080411 A1 Jun. 27, 2002

Related U.S. Application Data

(63) Continuation of application No. 07/461,344, filed on Jan. 5, 1990, now Pat. No. 6,219,093.

(51) Int. Cl.[7] .................................................. H04N 7/18
(52) U.S. Cl. ..................... 348/135; 348/161; 348/169
(58) Field of Search ................................ 348/135, 143, 348/161, 169; 358/400, 496, 406, 488; H04N 7/18, 5/225

(56) References Cited

U.S. PATENT DOCUMENTS 2,777,011 A * 1/1957 Marks .......................... 348/42
3,401,262 A * 9/1968 Fergason ..................... 250/331
3,986,022 A * 10/1976 Hyatt ........................... 250/205

FOREIGN PATENT DOCUMENTS

JP        5277699    *  6/1977

* cited by examiner

*Primary Examiner*—Sherrie Hsia
(74) *Attorney, Agent, or Firm*—Fish & Richardson P.C.

(57) ABSTRACT

A technique of using an electronic device to change light into the facsimile of an image. Signals are generated, indicative of the image shape. An array of electro optical devices are transformed based on the image signals, and those devices are used to transform the light characteristics.

1 Claim, 2 Drawing Sheets

METHOD AND DEVICE FOR CREATING A FACSIMILE OF AN IMAGE

This is a continuation of U.S. application Ser. No. 07/461,344, filed Jan. 5, 1990 now U.S. Pat. No. 6,219,093 (allowed).

FIELD OF THE INVENTION

This invention relates to a device and method for creation of a facsimile of one or more selected images, which may or may not be moveable within a field of images. More particularly this invention relates to a method and device for selecting one or more images from a field, tracking the image, creating a facsimile of the image and continuously updating the facsimile as the image changes. Still more particularly and with reference to but one embodiment of the present invention a device and method are set forth for selecting an image, creating a real-time facsimile of the selected image at an opaque electro-optical device such as an LCD and projecting electromagnetic radiation including coherent or incoherent visible light through the device to illuminate the selected image and minimize the shadow created by the illumination.

BACKGROUND OF THE INVENTION

With reference to but one specific embodiment of the present invention, it has been long known to illuminate an entertainer on stage using one or more spotlights. As the entertainer moves and traverses the stage, the spotlights are manipulated to follow him or her. This illumination of the entertainer, while attenuated by the use of several spotlights, results in overspotting which creates shadows cast on the stage or backdrop. While the beams from the spotlights may be focused, illumination of the entertainer and his or her limbs creates the aforesaid shadows and spotting. These shadows can detract from the entertainer and may cause reflections or other problems during filming or videotaping. Heretofore there has been no satisfactory means to illuminate the movable entertainer so as to eliminate shadows and spotting. Further it has been necessary to provide lighting personnel at each spotlight to track the entertainer and focus the beam. This increases the labor costs for lighting and also restricts the placement of the spotlights in that sufficient space must be provided to accommodate the operator.

SUMMARY OF THE INVENTION

There is therefore provided according to but one aspect of the present invention a device and method to select one or several images (eg. an entertainer) from a field of images (eg. the stage and props) and to create a transparent facsimile or silhouette which changes in accordance to the movement of the entertainer. Illuminating light or other forms of radiation is projected and focused through the facsimile to illuminate only the form of the entertainer thereby eliminating or minimizing the casting of shadows and spotting. In a further aspect of the present invention, if the selected image is movable within the field, tracking is provided through image recognition and comparison or by an interactive locator or by pre-programming the movements of the image to correspond to predetermined movements and changes in form of the image. In a more broad aspect of the present invention, a device and method are set forth for creating a facsimile or silhouette of the image. For example in animation, an animal may be the selected image. Following the movements of the animal a facsimile or silhouette of the movements and form of the animal is created. By photographic or tracing or other techniques the facsimile may then be used to create an animated animal whose movements closely mimic those of the selected animal. In still a further aspect of the present invention, transparent facsimiles are created each for the colors red, green and blue of a color scene. By projecting red, green and blue light through their respective transparencies a full color image is thereby created upon a screen.

In still another aspect of the present invention x-ray or other forms of radiation may be directed through a suitable facsimile to thereby cast radiation from the source in a pattern dictated by the facsimile.

These and other feathers and advantages will become better appreciated as the same becomes better understood with reference to the drawings, specification and claims.

BRIEF DESCRIPTION OF THE DRAWING

With reference to these feathers and advantages the present invention will now be described with reference to the drawings wherein.

DESCRIPTION

Figure 1:
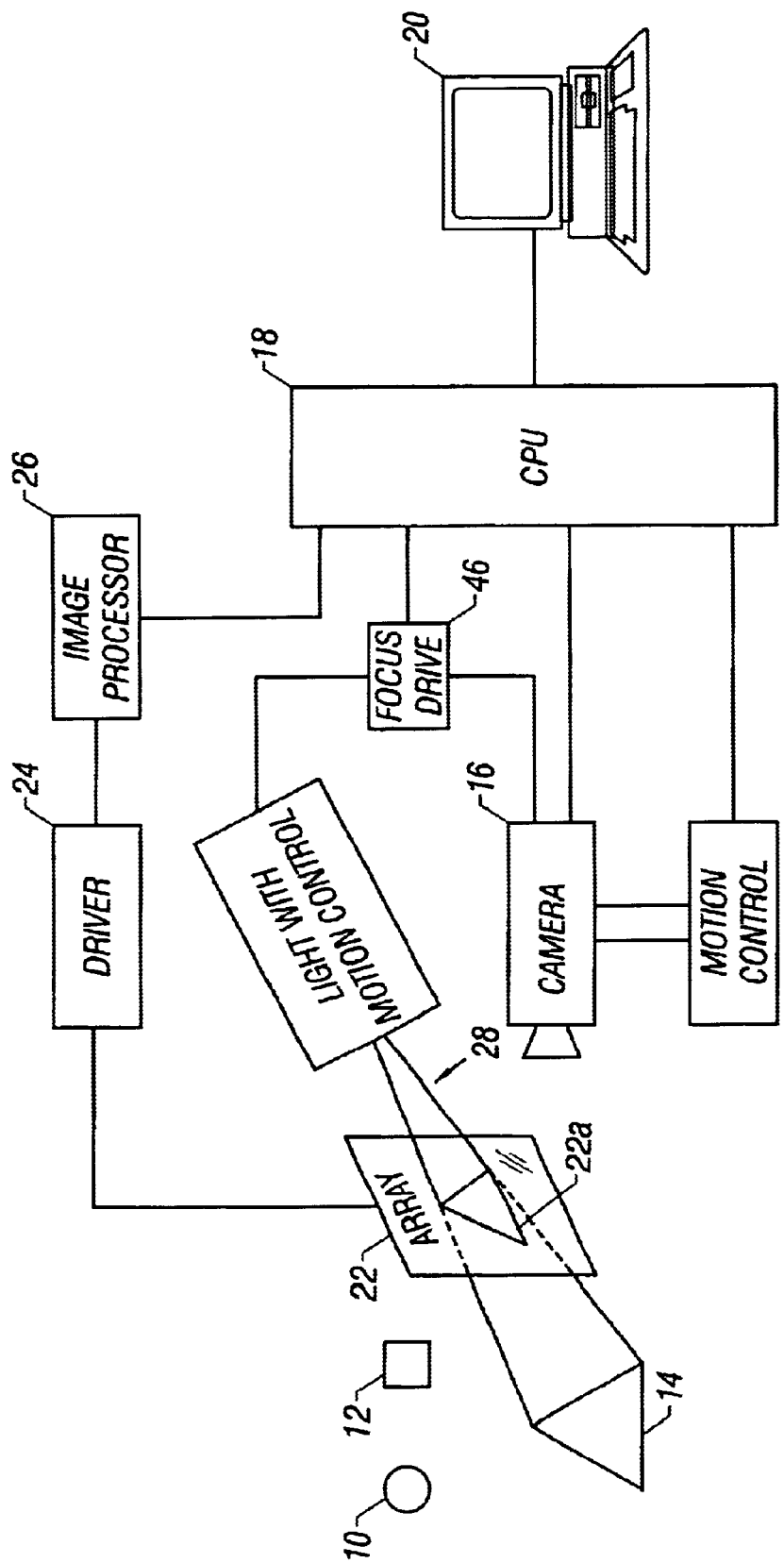
FIG. 1 depicts one embodiment of a device and method for creating a facsimile of an image within a field of images.

With reference to FIG. 1, one embodiment of the present invention will now be described. It is to be understood that the invention as shown and described is simplified to aid in the understanding thereof.

Accordingly a field of objects is provided which includes a circle 10, square 12 and triangle 14 are perceived by camera 16. It is to be understood that the field could be a stage including an entertainer, cast and props. Further it is to be understood that while the description hereinafter set forth relates primarily to images that are visually perceptible, that images may be perceptible at other electromagnetic ranges such as infrared or radar. In those instances, camera would be an infrared camera or a radar receiver. Further the camera as described according to the present invention may be a sonic receiver such as a sonar receiver. Suffice it to say, camera as used according to the present invention should be understood to be any type of device capable of receiving indicia of a field no matter by what medium the field is perceived.

Camera 16 may be a digital camera or a line scanning camera which typically scans 480 to 700 horizontal scan lines per frame or a charged coupled device.

Signals from camera 16 are arranged into a matrix of signals such as by the technique disclosed in U.S. Pat. No. 4,760,607 issued Jul. 26, 1988 to Sternberg et al. which is hereby incorporated by reference. Accordingly signals from camera 16 are processed by central processing unit or CPU 18 into a suitable matrix of pixel signal words, each representative of at least the intensity of a segment or point of the image field as perceived by camera 16. For example each word may be the intensity of the point from a range of one to eight with eight being a maximum intensity and one being a minimum intensity as is described in Sternberg et al. referenced above.

Means are provided to, based in part upon the matrix of pixel signal words to select the desired object, here triangle 14, from the field for further processing as hereinafter described. One suitable means to distinguish the triangle from other objects in the field includes means for comparing the matrix of pixel signal words to a preselected matrix of words as, for example, inputed via terminal 20. Through terminal 20 the system operator inputs data into CPU 18 to initialize the same with a initial base matrix of signal words for comparison to the matrix corresponding to the field as perceived by camera 16. This comparison could be through intensity, shape of form, location within the field or some or all of the foregoing. The operator may pre-program the CPU with an appropriate algorithm to enable the CPU to recognize, when compared to the matrix of signal words in conjunction with camera 16, those words of the matrix having an intensity or range of intensities or corresponding to a particular shape or positioned at a particular location within the field or any combination of the foregoing so as to distinguish the triangle from the circle and square or any other objects lying within the field as perceived by the camera. Alternatively the operator would pre-initialize the system by viewing the matrix of pixel words at the terminal as the field is initially perceived by the camera and then, through the keyboard or by a touch screen, initialize the CPU to initially recognize the location and shape and/or intensity so as to distinguish the triangle from the other objects of the field. If the selected image, here triangle 14, is subject to change in position or shape or form other reference data may be imputed to the CPU so that the other positions or forms or ranges of positions or forms of the selected image may be compared to the matrix of pixel signal words corresponding to the field as perceived by camera 16 for selection of the desired image from the field.

Again recognition based upon intensity may play a part in the identification and selection of the desired image.

When initialized (or pre-initialized) CPU would be pre-programmed not only as to form or location but also as to the intensities relating to the selected object.

Therefore, CPU operates upon the matrix of pixel signal words to compare and distinguish the selected image triangle 14 from the field of objects perceived by the camera. CPU then identifies the locations of those pixels which represent or correspond to the triangle and stores the locations of those pixels in memory.

To assist in identifying, distinguishing and selecting the desired object from the field, an interactive image recognition system may be provided. For example, the triangle may be provided with an infrared emitter or reflector which interacts with a receiver. Receiver perceives the field in a known relationship to the field as perceived by the camera and identifies the location of the emitted or reflected light and provides that location, for example an $X_n$, $y_m$ position to the CPU. A related interactive location identification system is described in U.S. Pat. No. 3,798,795 issued on Mar. 26, 1974 to Michelsen the disclosure of which is hereby incorporated by reference. CPU then compares the position as determined by the interactive means described above to the location of the pixels locations corresponding to the selected image to assist in identifying and recognizing the selected image. Alternatively the selected image may be provided with a device to emit or reflect a certain spectra of electromagnetic radiation, eg. light of a specific wavelength as emitted or reflected by a laser. A receptor identifies, as above, the location of the source of the emitted or reflected electromagnetic radiation, and provide that matrix location to the CPU.

Also included, according to the present invention, is an array 22 of electro-optical devices transformable between a first condition and a second condition in response to electrical stimulation. For example array 22 may be a liquid crystal device or LCD including an array of devices each transformable, in response to electronic stimulus, between a condition of transparency and opaqueness. Driver 24 drives each device in the LCD array between the aforementioned conditions in a manner well known according to the prior art.

Driver 24 communicates with image processor 26 which may be part of but in any event communicates with the CPU. Image processor 26 is initialized by the CPU to drive driver 24 to render those devices in the array corresponding to a facsimile or silhouette of the selected image, triangle 14, transparent whereas the remainder of the devices are opaque as is shown in FIG. 1. The initial drive signals are stored in a suitable memory associated with the image processor.

As each frame of the perception of the field of images is received by the camera, the selected image (triangle) is identified and distinguished from the field of images.

CPU segregates the locations of the pixel signal words representative of the triangle and issues those signals to the image processor. The image processor compares those signals to those stored in its memory. If a change in the form or location of the selected object is noted, the memory is updated. Further the driver is driven to make the appropriate changes in the LCD to continue to generate a transparent facsimile of and corresponding to the selected image. If there is no change in form or location, the driver continues to drive the LCD as before. As can be appreciated, therefore, LCD is driven to generate a facsimile of the selected object on a continuous basis so as to mirror any changes in form or location of the image.

Figure 2:
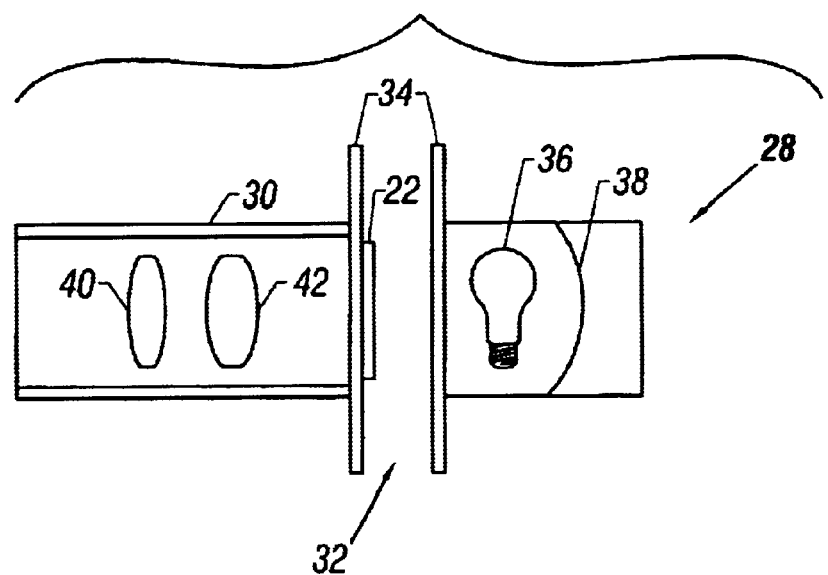
FIG. 2 is a side section view of a device for projecting an image of the aforesaid facsimile.

Turning to FIG. 2 the LCD array is seen incorporated into light 28. Light 28 includes a housing 30 having a chimney 32 therethrough. Chimney 32 is defined by transparent walls 34 one of which mounts the LCD. Cooling air, whether by natural convection of by forced draft by employment of a fan passes through chimney to cool the LCD. A lamp 36 generates incoherent light which is focused by a concave mirror 38 to pass through chimney and LCD as shown in the drawings. Also provided are lenses 40, 42 which act in a well known fashion to focus the light having passed through the LCD. As hereinafter described lenses 40,42 may be mounted to be driven by suitable devices along their optical axes for remote focus. As can be appreciated light from the lamp passes through the LCD and is focused by the lenses to illuminate any objects in its path.

When the method and devices according to the present invention are operated, the LCD array is updated and driven to generate a transparent facsimile of the triangle thereat to the exclusion of the remainder of the field.

Light from the lamp is cast through the LCD array and is focused to illuminate only the triangle to the exclusion of the other objects of the field. Though the triangle may change in form or location, this change is noted and the LCD array is appropriately updated to continue to generate a corresponding facsimile for illumination of only the triangle.

Should the selected image be not only changeable in form and location but also be able C-o traverse an area which would fall outside of the field of view of fixed camera 18, suitable tracking means are provided to track and maintain the selected object in the field of view of the camera. Accordingly the camera and light are mounted together for articulation about x, y, and z axes as is illustrated in FIG. 1, as are known in the prior art, are provided to manipulate articulation of the camera/light unit. The camera and LCD and the lenses of the light may be selected or arranged such the field of view of the camera corresponds to the field of full illumination of the light as cast and focused by the light.

As described above, the field is perceived by the camera and a matrix of pixel signal words are generated. CPU, by the methods described above, recognizes and selects the selected object (triangle) CPU compares the location of the pixels corresponding to the selected image as perceived by the camera to those stored in the memory which correspond to the location of the selected image pixels from the prior frame. Should the location comparison indicate that the selected object is nearing the limits or bounds of the matrix, the camera/light unit is articulated to return or center the selected object within the field of perception of the camera and within the corresponding pixel matrix. As each frame of signals are received from the camera, CPU compares and updates thereby providing feedback as to the orientation of the selected image within the field of perception. Of course there may be manual control over the camera/light unit via a joystick or the like. The interactive recognition system described above may also be used to assist in tracking of the selected image.

Throughout the foregoing procedure, the LCD array is driven to illuminate the selected object as described above.

Focusing may also be provided. In that the camera and light are married to cooperate in the manner described, mutual focusing may be provided as a single focus drive unit 46.

The intensity of the words of the pixel signal array corresponding to the selected image are continuously compared to those stored in the memory of the CPU. Should the intensity at those pixels representing the selected image or those at the bounds of the selected image fall off in a manner and quantity indicating an out of focus condition, CPU drives the focus controller 46 to sharpen the image as perceived by the camera and as illuminated by the light. The CPU may be pre-programmed to assume that the selected object is approaching and to activate the focus control accordingly for a first time period. If the intensity indicates a "better" focus, focus drive is continued until the intensity, for example at the bounds of the image, corresponds to a predetermined condition of focus. If during the initial time period the out of focus condition continues, a seeking procedure may be initiated to focus the image.

Preferably the camera/light unit is positioned at a suitable distance such that focusing is not required.

As can be appreciated from the foregoing, and in a theatrical setting, an entertainer would constitute the selected image with the field comprising the stage, props and supporting cast. The camera/light unit is positioned at a remote location with the CPU and terminal at any convenient location such as a control room. In that a light operator need not be situated with the unit, the camera/light unit can be positioned atop a boom or other location without regard to operator safety. The system is the initialized as by, for example, pre-programming the CPU to recognize the entertainer and his/her form and location and light intensity at certain time intervals such as during a dress rehearsal. Of course the interactive recognition means described above may be provided on the entertainer to assist in recognition. Furthermore the system may be only initialized by establishing the form, location and reflected light intensity of the entertainer at the beginning of each act or sketch with the methods and devices according to the present invention recognizing and tracking the entertainer.

Throughout the presentation the method and devices according to the present invention operate to generate a facsimile of the entertainer and, via that facsimile, illuminate only the entertainer to the exclusion of the field.

Of course it is to be understood that the methods according to the present invention may be adapted to recognize, track, and generate facsimiles for two or more object in the field.

OTHER APPLICATIONS

The present invention has a wide variety of applications hereinafter discussed.

Figure 3:
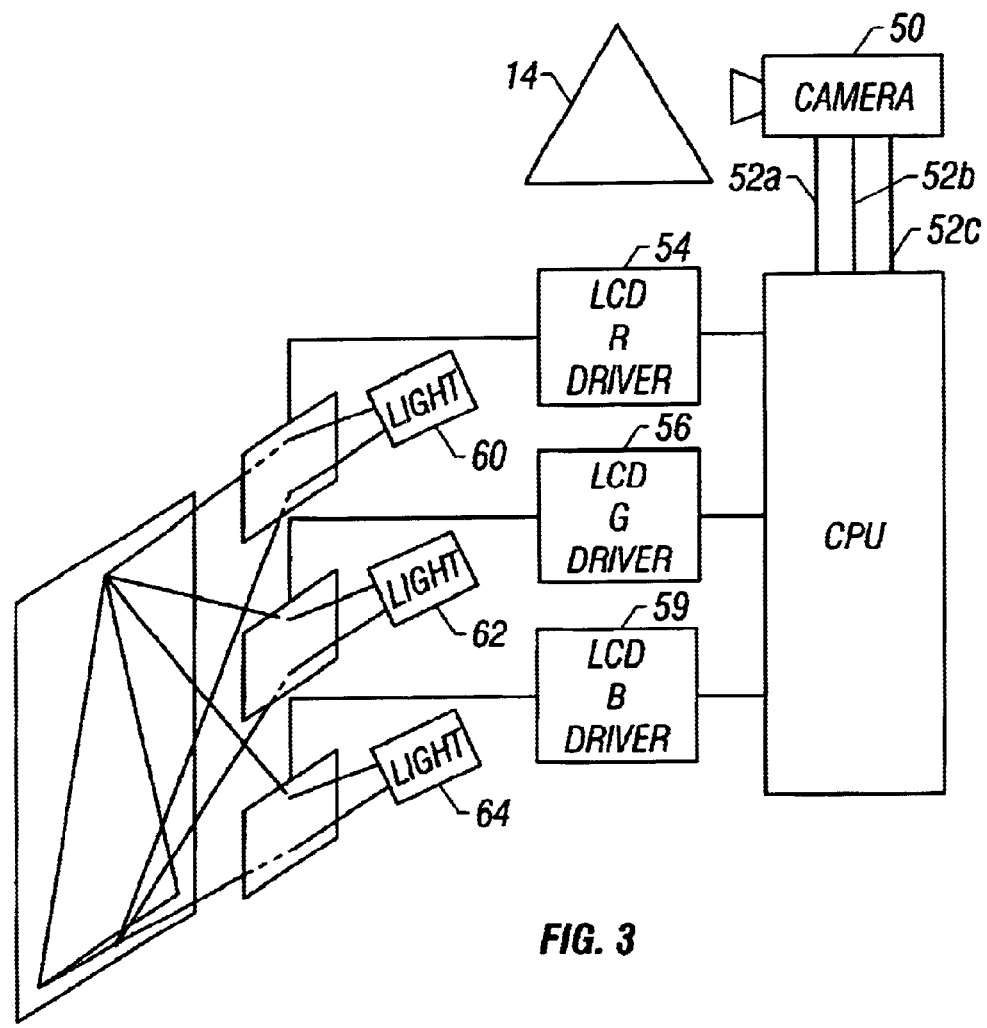
FIG. 3 illustrates another embodiment of their present invention for recreating a color image.

With reference to FIG. 3, a color camera 50 is provided which generates signals 52a, 52b, 52c each corresponding, respectively, to the colors red, green and blue of the field as perceived by camera 50.

From camera 50 corresponding red, green and blue matrices of pixel signal words are generated. Accordingly each matrix of pixel signal words represents, in intrensity and location, the red, green and blue colors of the field.

In the manner described above from each of these pixel signals matrices, CPU is pre-programmed to select those matrix locations or pixels which will be issued to drive the LCD array corresponding to the appropriate color. Low intensity pixel words may be eliminated in that these would indicate background. LCD driver red 54 is then driven to generate a facsimile of the red elements of the field to the exclusion of non-red colored elements of the field.

Similarly LCD driver green 56 is driven to generate a facsimile of the green elements of the field and LCD driver blue 58 is driven to generate a facsimile of the blue elements of the field. The corresponding color of light is projected through each LCD by corresponding red, green and blue light sources 60, 62 and 64 and its facsimile and is focused to recreate, in color, the field as perceived by the camera.

Of course it is to be understood that any particular image from the field may be selected for the aforementioned treatment to the exclusion of the other elements of the field in the manner described above.

In still another application of the present invention the facsimile created thereby may be used to provide a silhouette which can be artistically completed for each frame of animation to generate an animated character. Accordingly the facsimile as generated by the CPU is stored by any suitable means for playback for animation. By simply viewing a live person or animal with the camera and methods according to the present invention a suitable silhouette or facsimile is created.

In still another application of the method according to the present invention, the camera may be adapted to perceive the infrared spectra of a field. Alternatively the camera may be a radar receiver. Signals are generated and operated upon as above to identify a desired object(s)from the field perceived by the camera or receiver. The selected object(s)are then recreated via employment of a facsimile on a screen, board or a head's up display in the manner described above.

While these and other features and advantages are apparent, it is to be understood that the foregoing description is set forth for purposes of understanding and not by way of limitation.

What is claimed is:

1. A method for generating a facsimile of an image comprising:

generating at least one electrical signal representative of a particular shape; and arranging said at least one signal into at least one pixel signals representative of location of at least some points of the image field;

providing an array of electro-optical devices, each transformable between a first condition and a different second condition in response to electromagnetic stimulation; and using said pixel signals to stimulate the devices in said array to generate at said array a facsimile of said particular shape.

* * * * *